(12) United States Patent
Cigarini

(10) Patent No.: US 11,117,205 B2
(45) Date of Patent: Sep. 14, 2021

(54) PORTABLE SHARPENER

(71) Applicant: TECOMEC S.R.L., Reggio Emilia (IT)

(72) Inventor: Enrico Cigarini, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 215 days.

(21) Appl. No.: 16/283,210

(22) Filed: Feb. 22, 2019

(65) Prior Publication Data
US 2019/0299308 A1    Oct. 3, 2019

(30) Foreign Application Priority Data

Mar. 28, 2018    (IT) ........................ 102018000004034

(51) Int. Cl.
*B23D 63/16*    (2006.01)
*B24B 3/58*    (2006.01)
*B24B 41/06*    (2012.01)

(52) U.S. Cl.
CPC .............. *B23D 63/166* (2013.01); *B24B 3/58* (2013.01); *B24B 41/066* (2013.01)

(58) Field of Classification Search
CPC .... B23D 63/003; B23D 63/16; B23D 63/166; B24B 3/36; B24B 3/58; B24D 15/06; Y10T 279/23
USPC ............. 269/8; 279/128; 451/349, 355, 419; 76/29, 80.5
See application file for complete search history.

(56) References Cited

U.S. PATENT DOCUMENTS

| | | | |
|---|---|---|---|
| 2,780,897 A | 2/1957 | Radase | |
| 2,792,724 A * | 5/1957 | Durall | B23D 63/166 76/40 |
| 3,071,026 A | 1/1963 | De Witt | |
| 3,779,103 A | 12/1973 | Silvey | |
| 3,877,324 A | 4/1975 | Silvey | |
| 4,416,169 A | 11/1983 | Silvey | |
| 4,463,630 A * | 8/1984 | Turner | B23D 63/166 76/41 |
| 4,617,763 A | 10/1986 | Edling | |
| 4,658,677 A * | 4/1987 | Lusetti | B23D 63/166 76/80.5 |
| 4,762,027 A * | 8/1988 | Fagiolini | B23D 63/166 76/40 |

(Continued)

FOREIGN PATENT DOCUMENTS

EP    2067558 A1    6/2009

*Primary Examiner* — Joseph J Hail
*Assistant Examiner* — Arman Milanian
(74) *Attorney, Agent, or Firm* — Pearne & Gordon LLP

(57) ABSTRACT

A portable sharpener for chains of chainsaws comprising sharpening means (2) and a coupling device (3).
The sharpening means (2) are configured to sharpen the teeth (102) of a chain (101) of a chainsaw.
The coupling device (3) supports the sharpening means (2) and is configured to be reversibly constrained to the chainsaw.
Furthermore, the coupling device (3) comprises a support structure (4) which has a first plate (4a) adapted to be arranged parallel to a main extension plane of a chain guide bar (100) of the chainsaw and a second plate (4b) configured to abut against the bar (100), in such a way as to be at least partly interposed between the bar and the chain (101).
The first and the second plate (4b) are arranged substantially in an L-configuration.
The coupling structure further comprises one or more attachment members (5) applied to the first plate (4a) and configured to constrain the support structure (4) to the bar (100) of the chainsaw.

14 Claims, 5 Drawing Sheets

(56) References Cited

U.S. PATENT DOCUMENTS

| | | | |
|---|---|---|---|
| 4,836,058 | A | 6/1989 | Shepherd |
| 5,117,713 | A | 6/1992 | Markusson |
| 5,400,546 | A | 3/1995 | Christian et al. |
| D366,662 | S | 1/1996 | Haffely et al. |
| 5,525,095 | A | 6/1996 | Baughman |
| 5,649,853 | A | 7/1997 | Kuo |
| 6,161,453 | A * | 12/2000 | Hensley ............... B23D 63/168 30/123.4 |
| D458,617 | S | 6/2002 | Wang |
| 7,121,932 | B2 | 10/2006 | Liao |
| 7,175,512 | B2 | 2/2007 | Huntington et al. |
| D559,872 | S | 1/2008 | Pfaff |
| D568,132 | S | 5/2008 | Heun |
| D594,887 | S | 6/2009 | Cigarini |
| D594,888 | S | 6/2009 | Cigarini |
| D595,318 | S | 6/2009 | Cigarini |
| 8,696,407 | B2 | 4/2014 | Dovel |
| D723,895 | S | 3/2015 | Dovel |
| D730,137 | S | 5/2015 | Onion et al. |
| D756,737 | S | 5/2016 | Cigarini |
| D757,514 | S | 5/2016 | Cigarini |
| D851,692 | S | 6/2019 | Cigarini et al. |
| 2002/0045404 | A1 | 4/2002 | Cantoro |
| 2005/0183545 | A1 | 8/2005 | Huntington et al. |
| 2007/0167121 | A1* | 7/2007 | Cendak ................. B23D 63/166 451/419 |
| 2008/0028048 | A1 | 1/2008 | Shekar CS et al. |
| 2008/0280548 | A1 | 11/2008 | Wilson |
| 2017/0232537 | A1* | 8/2017 | Lynn .................... B23D 63/166 76/80.5 |

\* cited by examiner

PORTABLE SHARPENER

FIELD OF THE INVENTION

The present invention relates to the sector of sharpening devices.

In particular, the present invention relates to a portable sharpener for chains of chainsaws.

DESCRIPTION OF RELATED ART

In order to ensure the cutting efficiency of a chainsaw, it is often necessary to carry out maintenance operations on its components.

A particularly sensitive component is undoubtedly the chain, which is subjected to considerable mechanical stress and wear during use of the chainsaw.

Over time, the teeth of the chain can lose their sharpness, also significantly reducing the efficiency of the chainsaw, as well as increasing the risk of breakage of the chain, resulting in danger to the user's health.

The importance of periodically carrying out maintenance operations aimed at sharpening the teeth is therefore evident, which allow the chainsaw to maintain optimum operating conditions, thus ensuring the maximum efficiency of the tool and minimum risks for the user.

However, the applicant has observed that this operation is particularly burdensome in terms of the time needed to execute the operation, as well as its complexity.

In fact, there are known bench-top devices that require the removal of the chain from the bar that supports it and guides it.

It is clear how such solutions result in a significant loss of time, also considering the impossibility to easily transport devices that can be used for sharpening in the location where the chainsaw is effectively used. Therefore, it is necessary to remove the chain, take it to a workstation specially set up for performing the sharpening operation, sharpen the teeth and replace the chain onto the bar of the chainsaw.

More efficient devices are also known that allow the sharpening of the teeth directly in situ, i.e. directly at the location where the chainsaw is in use, without requiring the removal of the chain from the bar.

This type of device involves the use of sharpening means which are associated with the chainsaw by means of suitable support structures.

However, this type of solution also has defects and inefficiencies that make it extremely inconvenient and impractical to use.

In fact, such devices provide support structures that are arranged around the chain, going to mechanically engage opposite surfaces of the bar.

The precariousness of this solution is clear, as by exerting even the slightest pressure on the sharpening means, a real risk of slippage of the support structure and handling of the sharpening means arises, especially during their use.

In addition to affecting the success of the operation, this occurrence can result in serious damage to the sharpener, chain or even worse, risks to the user's health.

In this context, the technical task underlying the present invention is to provide a portable sharpener which obviates the drawbacks in the prior art as described above.

In particular, an object of the present invention is to provide a portable sharpener that is efficient and easy to use, able to allow the sharpening of the chain of the chainsaw without having to remove it from the bar supporting it and able to maintain a stable positioning with respect to the chainsaw, thereby eliminating the risk of accidental and undesirable displacements during use.

SUMMARY OF THE INVENTION

The defined technical task and the specified aims are substantially achieved by a portable sharpener, comprising the technical characteristics set forth in one or more of the appended claims.

According to the present invention, a portable sharpener for chainsaws is shown which comprises sharpening means and a coupling device.

The sharpening means are configured to sharpen the teeth of a chain of a chainsaw.

The coupling device supports the sharpening means and is configured to reversibly constrain them to the chainsaw, in particular to a chain guide bar of the chainsaw.

In particular, the coupling device comprises a support structure which has a first plate adapted to be arranged parallel to a main extension plane of the bar and a second plate configured to abut against the bar, in such a way as to be at least partly interposed between the bar and the chain.

The first and the second plate are arranged substantially in an L-configuration.

The coupling structure further comprises one or more attachment members applied to the first plate and configured to constrain the support structure to the bar of the chainsaw.

Advantageously, the present portable sharpener for chainsaws makes it possible to carry out a sharpening operation of the teeth of a chainsaw directly in its location of use, without requiring costly and complex chain removal operations.

Furthermore, the particular shape of the support structure provides a stable reference able to prevent the accidental displacement of the sharpener during use.

A further object of the present invention is a method for sharpening the teeth of a chain of a chainsaw in situ that comprises the steps of:

providing a chainsaw and a portable sharpener for chainsaws according to the present invention;

applying the sharpener to the chainsaw;

sharpening the teeth by activating the sharpening means.

In particular, the step of applying the sharpener to the chainsaw comprises the steps of:

abutting the first plate against the bar, realising a reciprocal coupling by means of the attachment means arranging the second plate in abutment against the bar in such a way as to interpose the second plate at least partly between the bar and the chain;

The dependent claims herein incorporated for reference, correspond to different embodiments of the invention.

BRIEF DESCRIPTION OF THE DRAWINGS

Further characteristics and advantages of the present invention will become more apparent from the approximate and thus non-limiting description of a preferred, but not exclusive, embodiment of a portable sharpener, as illustrated in the accompanying drawings, in which.

Figure 1:
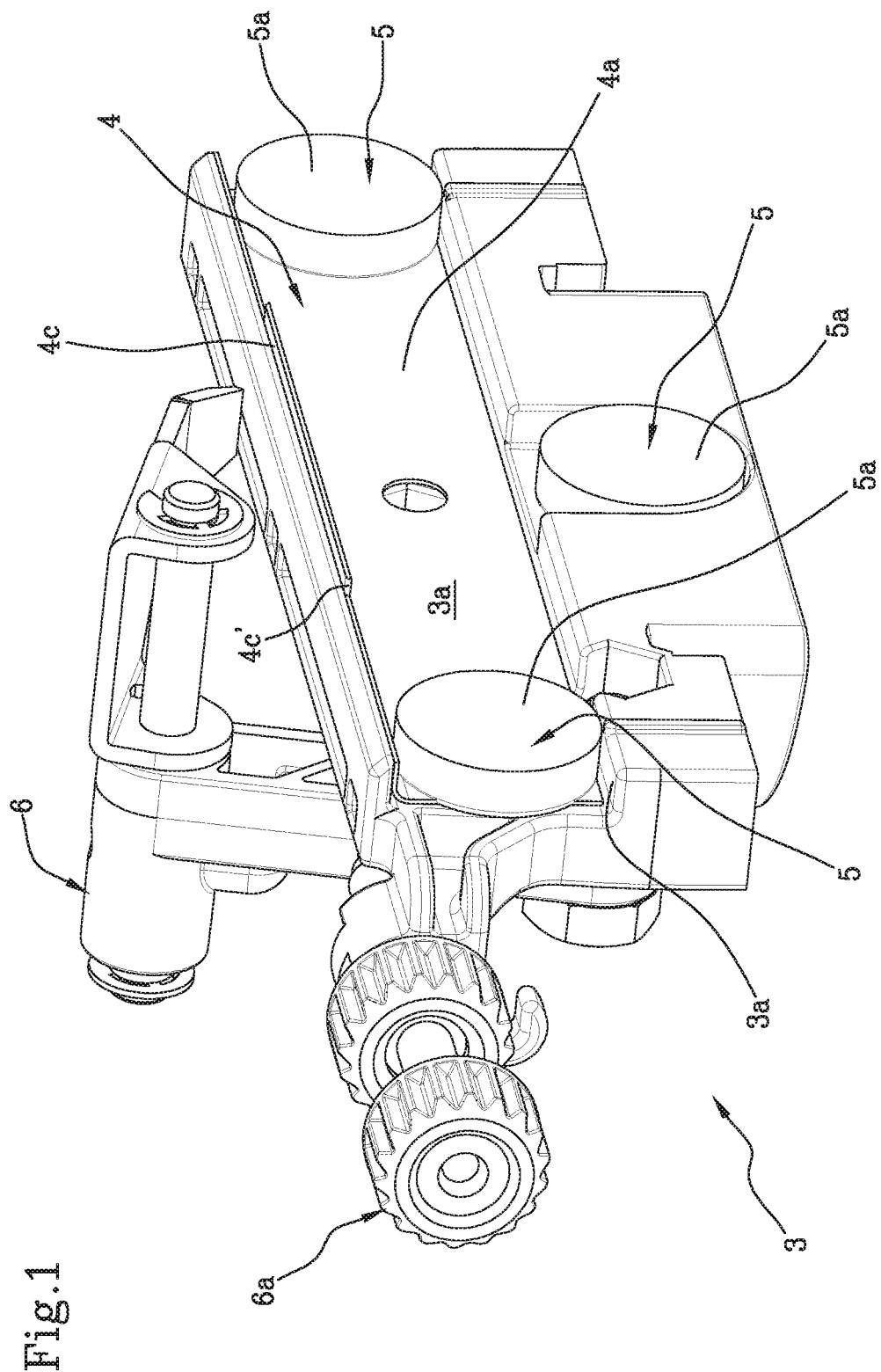
FIGS. 1-2 show in particular perspective views of a coupling device of the portable sharpener for chainsaws according to the present invention.
Figure 2:
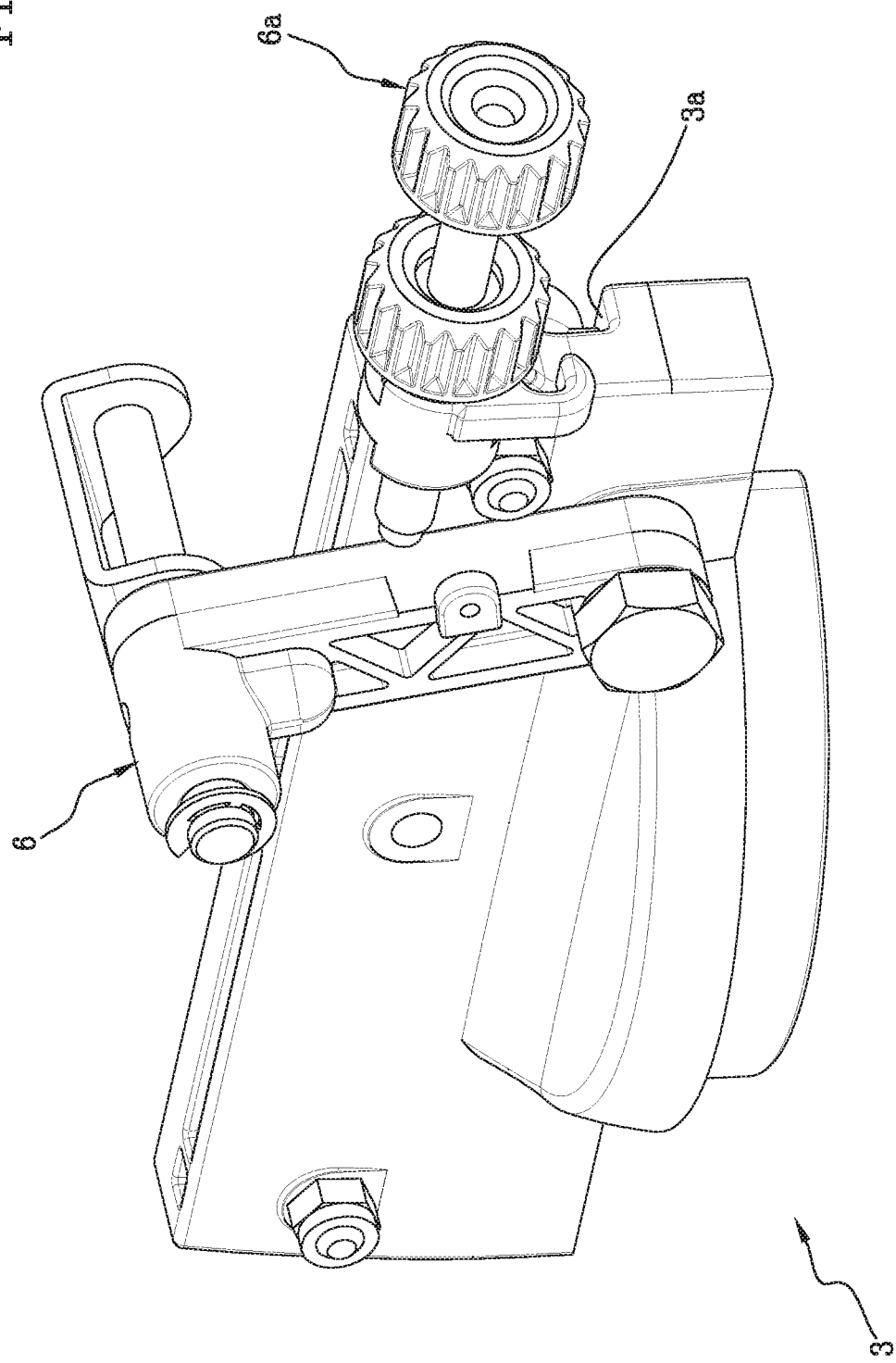
Figure 3:
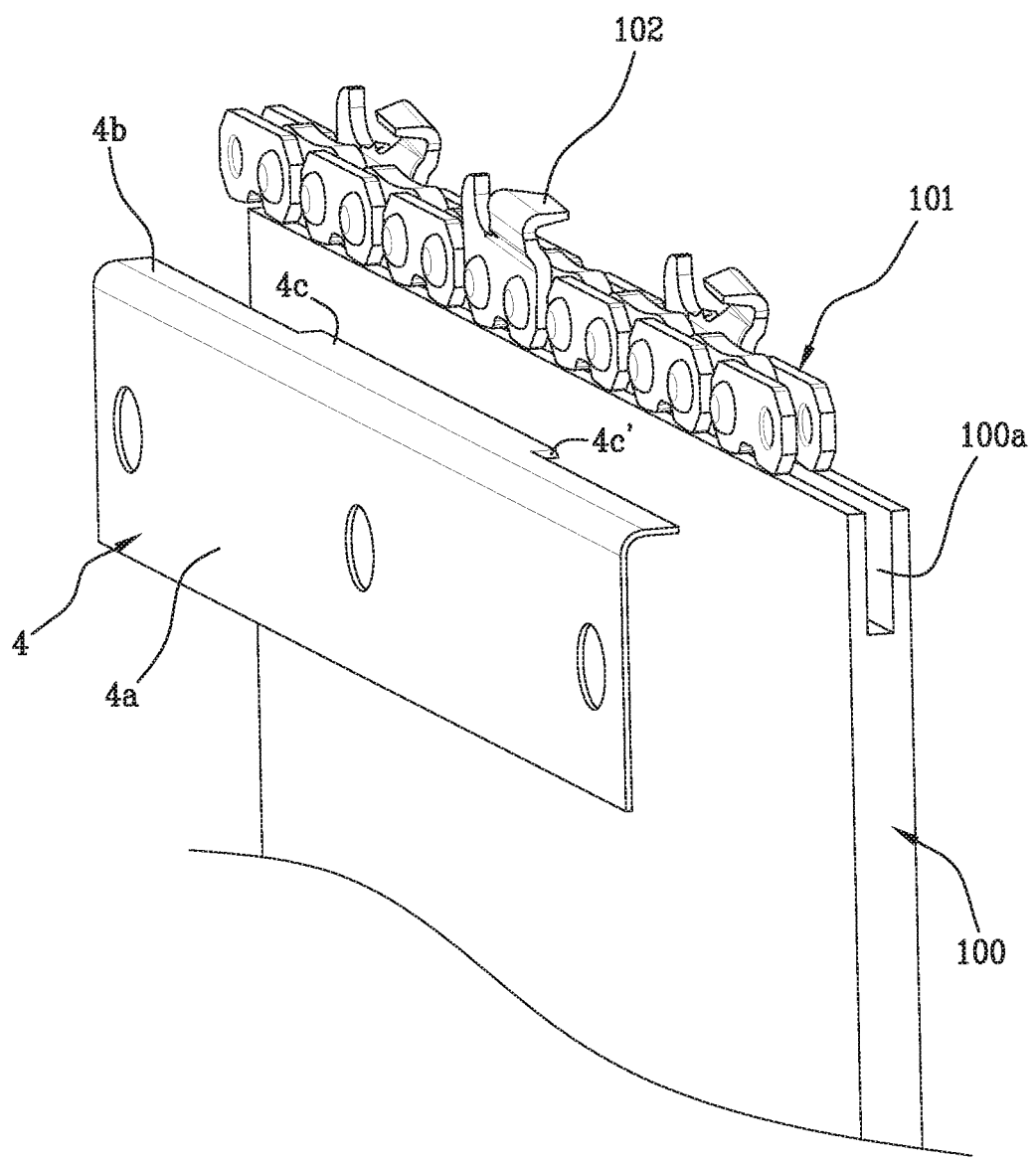
FIGS. 3-4 show for further clarity certain components of the sharpener that are coupled to the bar of a chainsaw comprising the chain to be sharpened.
Figure 4:
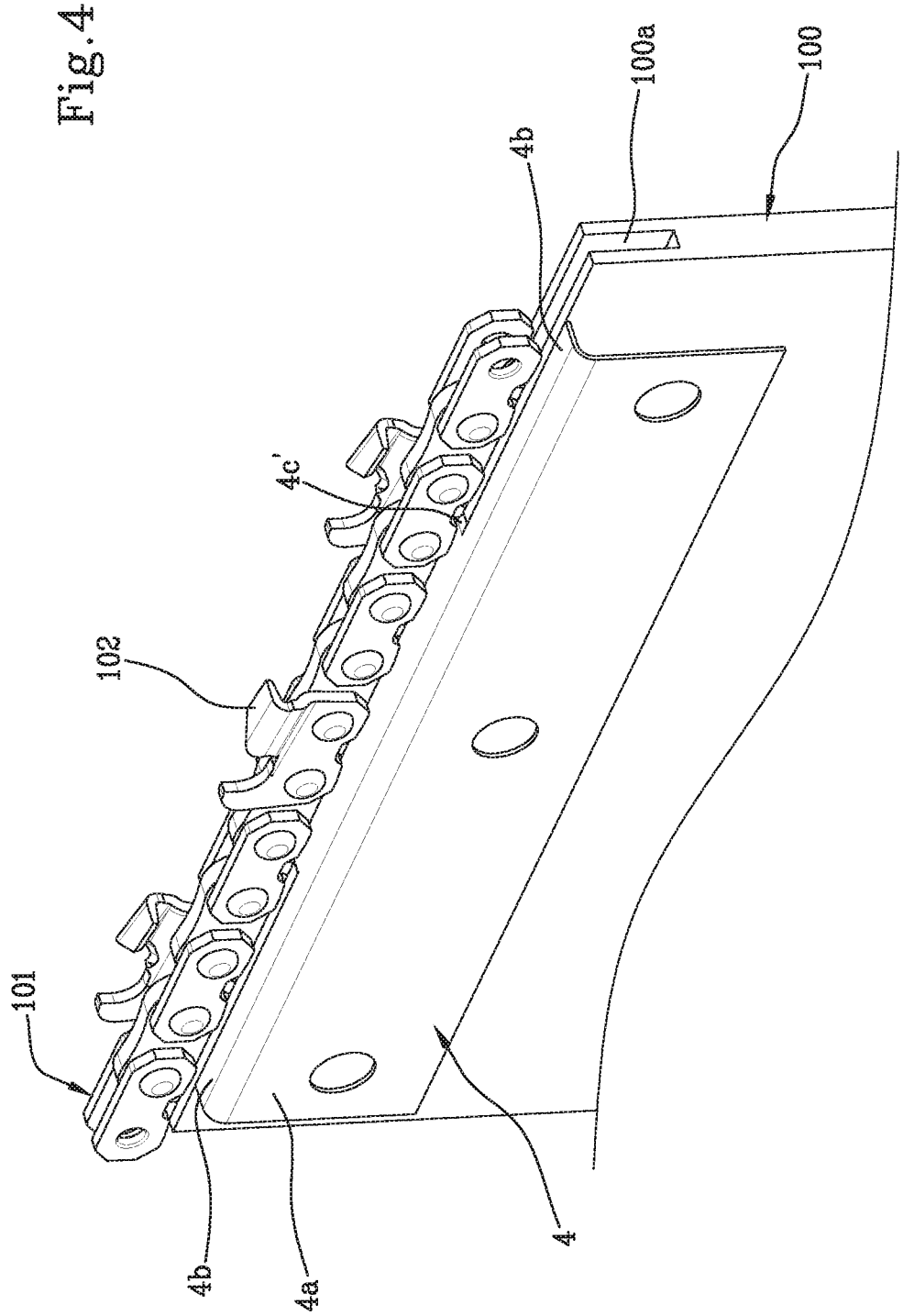
Figure 5:
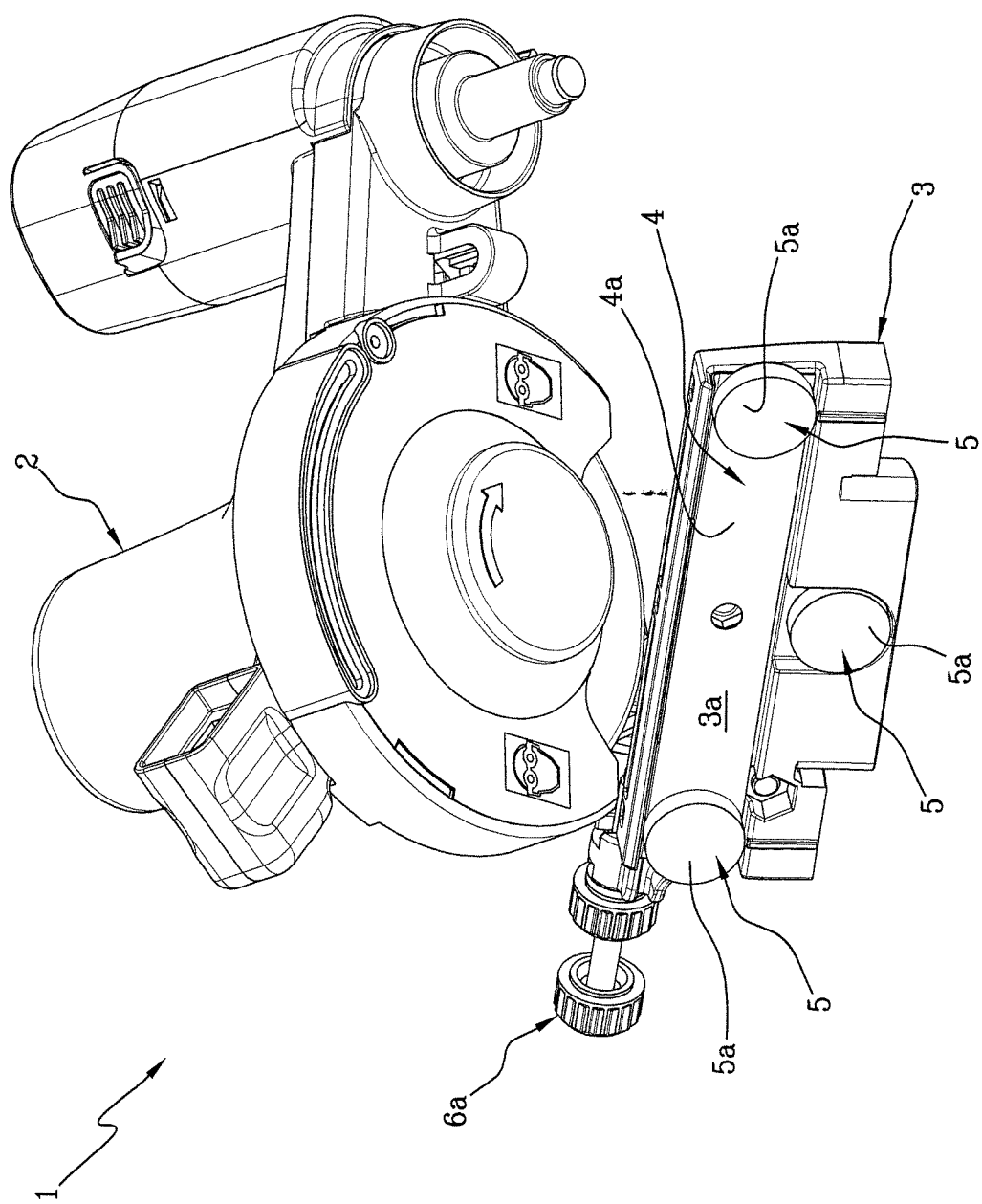
FIG. 5 shows a view of the coupling device and the sharpening means.

In the attached figures, the reference number 1 is used to generally indicate a portable sharpener for chainsaws according to the present invention.

DETAILED DESCRIPTION OF PREFERRED EMBODIMENTS OF THE INVENTION

The sharpener 1 comprises sharpening means (or at least one sharpening tool) 2 and a coupling device 3. The sharpening means (or at least one sharpening tool) 2 are configured to sharpen the teeth 102 of a chain 101 of a chainsaw while the chain 101 is mounted on a bar 100 of the chainsaw.

In other words, the product described herein makes it possible to carry out the sharpening of the teeth 102 of the chainsaw without needing to perform the burdensome operation of removing the chain 101 from the bar 100, thus making it possible to sharpen the teeth 102 also directly in the location where the chainsaw itself is in use.

The coupling device 3, in addition to supporting the sharpening means 2, performs the function of stably and reliably constraining the sharpener 1 to the chainsaw for the entire duration of the sharpening process.

In particular, the coupling device 3 comprises a support structure 4 capable of supporting the sharpening means 2, anchoring them to the bar 100 and one or more attachment members 5 configured to constrain the support structure 4 to the bar 100 of the chainsaw.

The support structure 4 comprises a first plate 4a and a second plate 4b arranged substantially in an L-configuration.

The first plate 4a is adapted to be arranged parallel to a main extension plane of the bar 100 and a second plate 4b configured to abut against the bar 100, in such a way as to be at least partly interposed between the bar 100 and the chain 101.

The two plates 4a, 4b of the support structure 4 therefore make it possible to associate the sharpener 1 with the chainsaw, abutting directly against the bar 100, thus ensuring a stable coupling between the two elements.

In fact, the weight force exerted by the sharpener 1 is in this way directly discharged on the bar 100, instead of on the attachment members 5, consequently eliminating the risk of disengagement of the same.

In accordance with a possible preferred embodiment, the attachment members 5 are a magnetic type of attachment members 5 that comprise a plurality of permanent magnets 5a.

In particular, each permanent magnet 5a defines an attachment surface comprised between 100 mm$^2$ and 400 mm$^2$ that makes it possible to stably anchor the sharpener 1 to the bar 100 of the chainsaw whose chain 101 is to be sharpened.

As shown in the accompanying figures, there are preferably three permanent magnets 5a which are arranged at the vertices of a triangle.

In particular, the coupling device 3 has a receiving portion 3a to which at least one, preferably two, of such permanent magnets 5a and the support structure 4 are mounted on the coupling device 3 in such a way that the first plate 4a is interposed between the receiving portion 3a and the permanent magnets 5a.

Any additional permanent magnets 5a can be present and applied to the coupling device 3 outside of the receiving portion 3a, preferably within appropriate recesses adapted to entirely accommodate the encumbrance of the permanent magnets 5a placed therein.

In particular, one of the aforementioned recesses defines the receiving portion 3a in such a way that the support structure 4 and the respective permanent magnets 5a associated with it are inserted substantially wholly within said recess, while any further permanent magnets 5a are inserted into additional recesses formed in the coupling device 3.

It follows that the second plate 4b extends transversely to the first plate 4a, for a length that is greater than the thickness of the permanent magnets 5a, in order to reach to engage the bar 100, namely in such a way that a terminal portion of the second plate 4b, exceeding the thickness of the permanent magnets 5a, defines at least one abutting tooth 4c that is transversal to the first plate 4a and insertable between the bar 100 of the chainsaw and at least one part of the chain 101.

In other words, the second plate 4b is configured to engage the chain 101 in such a way that a lower part of the base of the teeth 102 is distanced from the bar 100 and comes to slide above it.

In particular, the portion of the second plate 4b destined to be inserted between the bar 100 of the chainsaw and the chain 101, and in particular the at least one abutting tooth 4c, has a thickness comprised between 0.1 mm and 1 mm, preferably equal to about 0.5 mm.

To facilitate this engagement, the second plate 4b has a lead-in ramp 4c' configured for engaging the teeth 102, causing a raising of the teeth in a distancing direction from the bar 100.

Preferably, the lead-in ramp 4c' extends transversely to the advancement direction of the teeth 102 of the chain 101 on the chain guide bar 100.

In other words, the lead-in ramp 4c' is arranged in such a way as to provide a connection between the surface of the bar 100 on which the teeth 102 slide and an upper surface of the second plate 4b, in such a way that the teeth 102 are raised gradually.

In this way it is possible to easily obtain the at least partial interposition of the second plate 4b between the bar 100 and the chain 101.

When the sharpener 1 is applied to the chainsaw, the second plate 4b is partly inserted below the teeth 102 of the chain 101, so as to abut against the bar 100 itself, consequently, by virtue of the particular configuration of the support structure 4, the first plate 4a comes to be arranged alongside the 100 bar, parallel to it along one of its main extension planes.

The attachment members 5, associated with the first plate 4a, make it possible to engage it with the bar 100.

In other words; the attachment members 5 provide a stable reference; constraining the sharpener 1 along a direction perpendicular to the main extension plane of the bar 100, while the second plate 4b provides a stable reference, constraining the sharpener 1 along a direction parallel to the main development plane of the bar 100.

Preferably, the first plate 4a and the second plate 4b are made of one piece, i.e. the support structure 4 is made by folding a single initial plate. Alternatively, the first plate 4a and the second plate 4b are coupled by welding or compose a monolithic element formed through the removal of material or die-casting.

It should also be noted that the second plate 4b engages only a peripheral portion of the base of the teeth 102 that slide above it in such a manner that the drive links of the chain 101 remain at least partly arranged within a guide groove 100a of the bar 100, In other words, the second plate 4b raises the chain 101, thus distancing it from the bar 100, only for a height equal to the thickness of the second plate 4b itself, so that the second plate 4b is interposed between the peripheral portion of the teeth 102 and the bar 100, while the driving links still slide inside the guide groove 100a.

According to a further aspect of the present invention, the support structure 4 has a contoured shape suitable to adapt to the corresponding shape of the bar to which it must be applied.

Preferably, the first and second plate 4a, 4b have a planar geometry configured to adapt to respective portions having the planar geometry of the bar 100.

Alternatively, the first plate 4a has a planar geometry configured to adapt to a respective flat portion of the bar 100, while the second plate 4b has a curved trend configured to overlap with a respective portion of the bar 100 having a curved trend.

The sharpener 1 also comprises a locking device 6 configured to at least partly engage a tooth 102 of the chain 101 in such a way as to block the sliding of the same on the bar 100.

This device makes it possible to ensure that the chain 101 remains stationary during sharpening operations and that there is no accidental sliding of the teeth.

Preferably, the locking device comprises an adjustment member 6a configured to move the locking device in a precise and reliable way, thus ensuring the correct positioning of the tooth locked by the locking device 6 with respect to the sharpening means 2.

The sharpener 1 further comprises engagement means, not shown in the attached figures, associated with the coupling device 3 and configured for moving the sharpening means 2 between an operating position and a rest position.

In the operating position, the sharpening means 2 are found to be in contact with at least one tooth 102 of the chain 101, thus making it possible to perform the sharpening.

On the contrary, in the rest position the sharpening means 2 are not in contact with any tooth 102 of the chain 101.

The sharpener 1 according to the present invention further comprises known adjustment means, not shown in the attached figures, which are configured to change an angular position of the sharpening means 2 with respect to the teeth 102 of the chain 101.

In other words, it is possible to change the angle with which the sharpening means 2 engage the teeth 102 of the chain 101 in a way that makes it possible to accurately define the inclination with which the sharpening is to be performed.

Advantageously, the sharpener 1 can include appropriate indicators configured to indicate the inclination angle, and therefore the reciprocal sharpening angle to an operator between the sharpening means 2 and the teeth 102.

According to a preferred embodiment, the sharpening means 2 comprise an abrasive wheel.

The sharpener further comprises a motor configured to move the abrasive wheel in rotation and can be powered according to different possible known power sources.

Preferably, the motor is an electric motor of the type that can be powered in a direct manner by means of a supply line connected to an electrical utility or by means of a battery power supply, for example by means of batteries of the rechargeable type.

The present invention also relates to a method for in situ sharpening of the teeth 102 of a chain 101 of a chainsaw.

In other words, the present method relates to a sharpening procedure that can be performed directly at the location of use of the chainsaw, in particular without the need to remove the chain 101 from the bar 100, The method according to the present invention envisages providing a chainsaw, whose teeth 102 must be sharpened, and a sharpener 1 having the characteristics and peculiarities previously highlighted in this description.

The sharpener 1 is then applied to the chainsaw, stably constraining them to each other, in such a way as to ensure that there will not be any accidental movements of the sharpener 1 with respect to the chainsaw during use.

In detail, this step of applying the sharpener 1 takes place by abutting the first plate 4a against the bar 100 and realising a reciprocal coupling by means of the attachment members 5; Then contextually the second plate 4b is arranged in abutment against the bar 100 in such a way as to interpose it at least partly between the bar 100 and the chain 101.

In other words, the second plate 4b is inserted between the bar 100 and the chain 101, by lifting the latter away from the bar 100.

Once the sharpener 1 has been firmly associated with the chainsaw, it is possible to proceed to sharpen the teeth 102 by activating the sharpening means 2.

This sharpening step can be performed simultaneously on more than one tooth 102.

In other words, the sharpening method can affect a single tooth at a time or several teeth simultaneously.

Operationally, this means that once the sharpener 1 is applied to the chainsaw it is possible, through the action of the engagement means, to bring the sharpening means 2 into the operating position in contact with the cutting edge of a single tooth 102 to sharpen it.

Once the procedure is complete the sharpening means are brought back to the rest position and the chain 101 is made to slide, above the second plate 4b, in such a way as to position a further tooth 102 to be sharpened near the sharpening means 2.

The sharpening means 2 are then brought back to the operating position and the steps outlined above are repeated until all the cutting edges that must be sharpened have been ground.

Alternatively it is possible to position the chain 101 so that multiple teeth 102 engage the sharpening means 2 once they are brought into the operating position, allowing it to carry out the sharpening operation on multiple teeth 102 at the same time.

The method of the present invention also includes a step of adjusting an angular position of the sharpening means 2 with respect to the teeth 102 of the chain 101.

This step makes it possible to adjust the angle with which the sharpening means 2 engage the teeth 102 and consequently the angle with which the sharpening is carried out.

This aspect is particularly relevant when the sharpening procedure is performed simultaneously on multiple teeth 102, as it is essential to be able to change the orientation of the sharpening means 2 in such a way that these engage all the teeth 102 to be sharpened with a correct orientation, Advantageously, the present invention achieves the objects proposed, overcoming the drawbacks in the prior art, providing the user with a portable sharpener 1 for chainsaws that makes it possible to sharpen the teeth 102 of the chain 101 of a chainsaw in an easy and efficient way directly in its location of use.

The invention claimed is:

1. A portable sharpener for chainsaws comprising:
at least one sharpening tool (2) configured to sharpen the teeth (102) of a chain (101) of a chainsaw;
a coupling device (3) supporting the at least one sharpening tool (2) and configured to be reversibly constrained to a chain guide bar (100) of the chainsaw;
characterised in that said coupling device (3) comprises:
a support structure (4) having a first plate (4a) adapted to be arranged parallel to a main extension plane of the bar (100) and a second plate (4b) configured to abut against the bar (100) in such a way as to be at least partly interposed between said bar (100) and the chain (101), said first and second plate (4*b*) being arranged substantially in an L-configuration;

one or more attachment members (5) applied to said first plate (4*a*) and configured to constrain said support structure (4) to the bar (100) of the chainsaw.

2. The sharpener according to claim 1, said attachment members (5) comprising at least a permanent magnet (5*a*).

3. The sharpener according to claim 2, wherein said attachment members (5) comprise three permanent magnets (5*a*).

4. The sharpener according to claim 2, wherein the coupling device (3) has a receiving portion (3*a*) to which at least two of said permanent magnets (5*a*) are fixed, said support structure (4) being mounted on the coupling device (3) in such a way that the first plate (4*a*) is interposed between the receiving portion (3*a*) and said at least two permanent magnets (5*a*).

5. The sharpener according to claim 4, wherein the second plate (4*b*) extends transversally to the first plate (4*a*) for a length that is greater than the thickness of said permanent magnets (5*a*) so that a terminal portion of the second plate (4*b*), exceeding the thickness of the permanent magnets (5*a*), defines at least an abutting tooth (4*c*) that is transversal to the first plate (4*a*) and insertable between the bar (100) of the chainsaw and at least a part of the chain (101).

6. The sharpener according to claim 1, wherein the portion of the second plate (4*b*) destined to be inserted between the bar (100) of the chainsaw and the chain (101) has a thickness comprised between 0.1 mm and 1 mm.

7. The sharpener according to claim 2, wherein each permanent magnet (5*a*) defines an attachment surface comprised between 100 mm$^2$ and 400 mm$^2$.

8. The sharpener according to claim 2, wherein said permanent magnets (5*a*) are inserted in respective recesses of the coupling device (3).

9. The sharpener according to claim 4, wherein said permanent magnets (5*a*) are inserted in respective recesses of the coupling device (3), and wherein one of said recesses defines said receiving portion (3*a*) in such a way that said support structure (4) and said respective two permanent magnets (5*a*) are inserted substantially entirely in said recess.

10. The sharpener according to claim 4, wherein said at least an abutting tooth (5*c*) has a lead-in ramp (4*c*') configured for engaging the teeth (102), causing a raising of said teeth (102) in a distancing direction from the bar (100), realising the at least partial interposing of the second plate (4*b*) between the bar (100) and the chain (101).

11. A method for in situ sharpening of the teeth (102) of a chain (101) of a chainsaw, comprising the steps of:

providing a chainsaw and a portable sharpener (1) for chainsaws, wherein said portable sharpener (1) comprises (a) at least one sharpening tool (2) configured to sharpen the teeth (102) of the chain (101) of the chainsaw; and (b) a coupling device (3) supporting the at least one sharpening tool (2) and configured to be reversibly constrained to a chain guide bar (100) of the chainsaw; said coupling device (3) comprising (a) a support structure (4) having a first plate (4*a*) adapted to be arranged parallel to a main extension plane of the bar (100) and a second plate (4*b*) configured to abut against the bar (100) in such a way as to be at least partly interposed between said bar (100) and the chain (101), said first and second plate (4*b*) being arranged substantially in an L-configuration; and (b) one or more attachment members (5) applied to said first plate (4*a*) and configured to constrain said support structure (4) to the bar (100) of the chainsaw;

applying the sharpener (1) to the chainsaw;

sharpening the teeth (102) by activating the at least one sharpening tool (2);

characterised in that said step of applying the sharpener (1) to the chainsaw comprises the steps of:

abutting the first plate (4*a*) against the bar (100), realising a reciprocal coupling by means of said attachment means;

arranging the second plate (4*b*) in abutment against the bar (100) in such a way as to interpose the second plate (4*b*) at least partly between said bar (100) and the chain (101).

12. The sharpener according to claim 2, wherein said attachment members (5) comprise three permanent magnets (5*a*) arranged at vertices of a triangle.

13. The sharpener according to claim 1, wherein the portion of the second plate (4*b*) destined to be inserted between the bar (100) of the chainsaw and the chain (101) has a thickness of about 0.5 mm.

14. The sharpener according to claim 5, wherein said abutting tooth (4*c*) has a thickness comprised between 0.1 mm and 1 mm.

\* \* \* \* \*